Dec. 15, 1953   L. S. RUSSELL   2,662,650
UNLOADING MEANS
Filed March 24, 1952   2 Sheets-Sheet 1
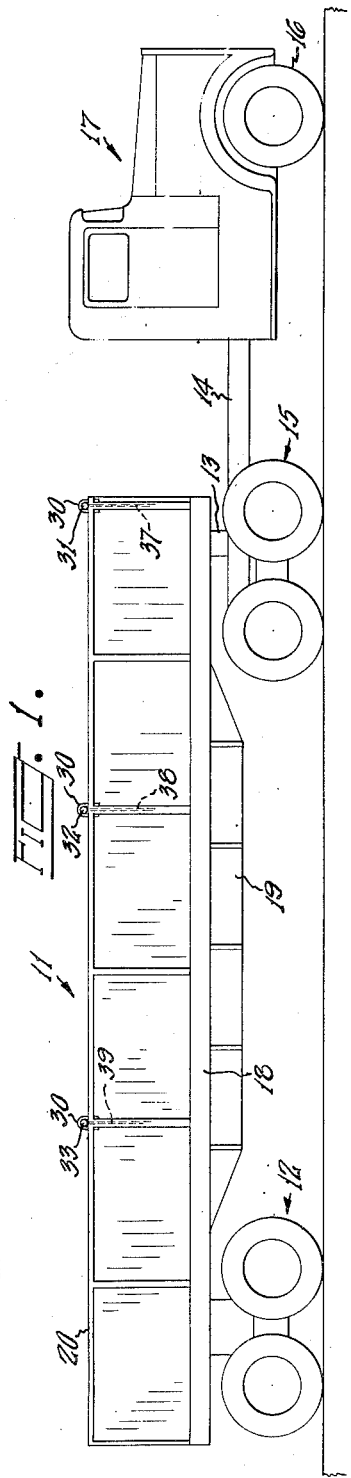
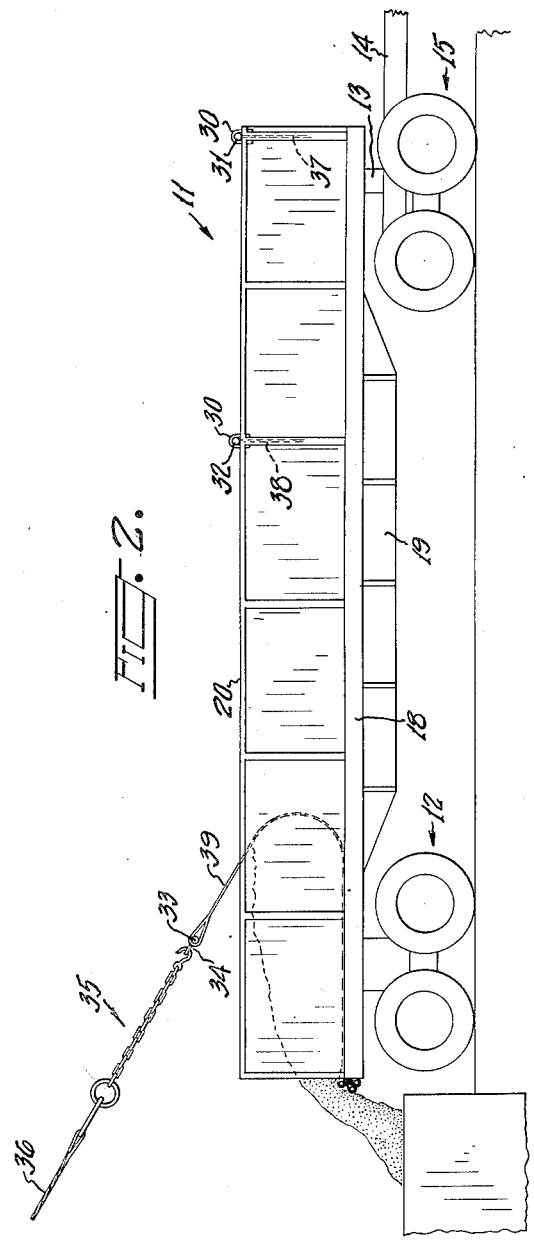
INVENTOR
LEWIS S. RUSSELL
BY  Mark Richardson
AGENT

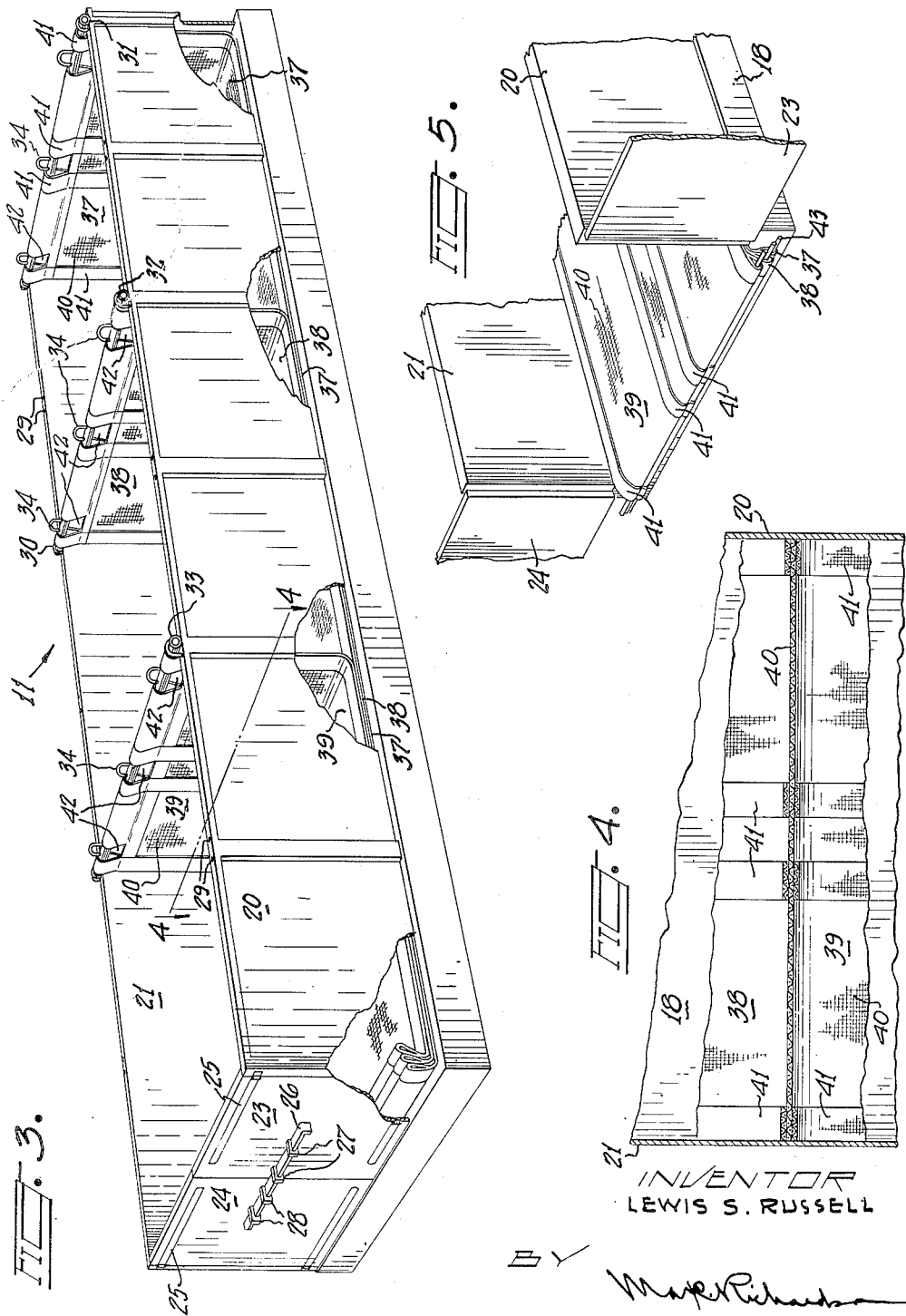

Patented Dec. 15, 1953

2,662,650

UNITED STATES PATENT OFFICE 2,662,650

UNLOADING MEANS

Lewis S. Russell, Portland, Oreg.

Application March 24, 1952, Serial No. 278,277

4 Claims. (Cl. 214—44)

1

This invention relates generally to means for moving bulk material from a bin in which such material is stored or transported and, in the particular case here typically disclosed, is shown and described as a non-dumping type of mobile truck body having a flat bed with impervious upright side and end boards mounted thereon, the rear end board being readily removable, in combination with one or more stripper sheets or curtains so arranged and adapted as to be conveniently manipulated to strip the load of bulk material from the truck body.

Various schemes have been devised whereby non-dumping truck bodies may be mechanically unloaded. Several of the schemes have been reduced to practice and are in common use. But as far as known, all of these previously devised schemes require a considerable amount of modification of the truck body and the permanent installation on the body of a considerable amount of mechanical equipment thus reducing the truck to a one job type of facility and adding materially to the cost of the modified truck.

On the other hand, my invention utilizes a practically unmodified flat bed truck body with accessories which can be used or not used at will in accordance with the particular use for which the truck is desired at the time.

It will also be seen that my invention provides means for dividing the truck body into multiple cells or compartments into which partial loads of desired quantities or of different commodities can be transported at one time and unloaded in a desired sequence.

It is a particular object of this invention to provide a non-dumping type of truck body complete with means for maintaining bulk material loaded therein in one or more isolated batches as desired together with means for quickly and economically unloading the isolated batches of bulk material in a pre-arranged sequence.

To accomplish the said particular object, it is second object of this invention to provide a truck body with a first stripper sheet of flexible material the full inside width of the truck body and of sufficient length to be laid the full length of the truck body and up the front end board of the truck body, together with means for carrying the upper front end of said sheet supported in a position of desired elevation above the front end of the truck bed.

A third object is to provide one or more similar additional stripper sheets of sequentially shorter lengths than the first stripper sheet, the additional sheets being adapted to be laid over the first sheet in the order of their decreasing lengths, means for holding the rear ends of each of the sheets in position at the rear end of the truck bed and means for supporting the forward end of each sheet in a position of desired elevation above the truck bed at a position rearwardly of the front of the truck bed at which the particular sheet is of the proper length to hang vertically downward to the truck bed and extend rearwardly to the rear end of the truck bed.

A fourth object of the invention is to provide a stiff bar for the upper front end of each of the sheets on which the sheet end is supported.

A fifth object is to provide eye means on each of said bars by which said bars may be engaged by an unloading means.

A sixth object is to provide each sheet with longitudinal reinforcing means adapted to relieve the main sheet material of much of the stress applied to the complete sheet in unloading.

A seventh object is to provide means carried on a side board of said truck body for positioning the end of a rod supporting the forward end of a sheet.

How these and other objects are attained will be made clear by the following description referring to the attached drawings in which, Fig. 1 is a side elevation of a large semi-trailer truck equipped to include the essentials of my invention.

Fig. 2 is a side view of the truck body of Fig. 1 being unloaded in accordance with the means of my invention.

Fig. 3 is a perspective view of the truck body of Fig. 1 partially broken away to show the essential elements of my invention.

Fig. 4 is a fragmentary horizontal section along the line 4—4 of Fig. 3.

Fig. 5 is a fragmentary perspective view of the rear end of the truck body of Fig. 3 with the rear end gate removed.

Like reference characters denote like parts in the several figures of the drawings.

Referring now to the drawings in Fig. 1 is shown a typical semitrailer mobile unit adapted to the purposes of my invention. The mobile unit includes a portable bin structure, shown generally at 11, mounted on an eight wheeled rear truck 12 and the fifth wheel unit 13 of a tractor unit which comprises a chassis 14 carried on an eight wheeled rear truck 15 and a two wheeled dirigible front truck 10. Chassis 14 carries an engine enclosure and cab 17 at its front end and fifth wheel unit 13 at the rear.

Portable bin structure 11 comprises a flat bed 18 trussed underneath for strength, as at 19, with impervious side boards 20 and 21 fixed vertically on the side edges of bed 18. Front end board 22 is fixed vertically on the front edge of bed 18, while rear end gates 23 and 24 are secured to side boards 20 and 21 respectively by hinges 25. Bar 26 through hasps 27 secured to gate 23, and hasps 28 secured to gate 24, is used to fix gates 23 and 24 in position to complete the side and end board closure of bin 11.

Pairs of spaced holes 29 are symmetrically formed as desired through the top surfaces of side boards 20 and 21 to receive heavy staples 30 adapted as shown to locate curtain bars 31, 32, 33, etc. longitudinally of the bin. Eyes 34 secured to curtain bars 31, 32, and 33, as shown, are for the purpose of attaching a bridle 35 of a hoisting cable 36 as shown in Fig. 2.

Curtain bars 31, 32, and 33 are adapted to engage and support stripper sheets or curtains 37, 38, and 39, as shown.

Each of the curtains 37, 38, and 39, are formed of a sheet of flexible material, like heavy canvas 40, banded longitudinally along each side edge and, as desired, intermediate the side edges with reinforcing bands 41 of heavy cotton webbing or the like. Each end of each of the curtains is folded back on itself and secured to form a transverse tunnel. At positions selected to make way for eyes 34 on bars 31, 32 and 33, openings 42 are formed through the tunneled forward ends of curtains 37, 38, and 39. Curtains 37, 38, and 39 are made as nearly as practicable the same width as the interior of bin 11.

When it is desired to make use of the apparatus and method of my invention in handling and transporting bulk materials, end gates 23 and 24 are closed and secured by bar 26 passing through hasps 28, 27. Curtain bar 31 is threaded through the partially cut away tunnel end of curtain 37 and then placed with its extending ends resting on side boards 20 and 21 of bin 11 where bar 31 is secured by staples 30 straddling bar 31 and extending into holes 29 in side boards 20 and 21. Curtain 37 then hangs vertically from bar 31 to the floor of bin 11 and extends along the floor of bin 11 rearwardly to end gates 23, 24 where the tunneled rear end of curtain 37 is turned upward and rests against gates 23, 24. The extra length of curtain 37 which allows it to be turned up and rest against end gates 23, 24 has the double purpose of, first, sealing the crack which may exist between the bottom edges of end gates 23, 24 and the floor of bin 11 when the bin is loaded and, second, falling outwardly when gates 23, and 24 are opening so that bar 43 (see Fig. 4), longer than the width of bin 11 can be inserted through the rear end tunnel of curtain 37 so that the rear of curtain 37 may not be pulled forward under the material being unloaded when the head of curtain 37 is pulled rearwardly by the hoist cable and bridle attached to curtain bar 31 in the manner shown in Fig. 2.

After curtain 37 has been placed as above described, curtains 38 and 39 may be similarly placed in sequence. The number and placement of the curtains used is determined by the requirements of the particular job.

When the desired number of curtains have been placed as desired to suit the extant conditions the several pockets or bin divisions formed in bin 11 by the curtains are filled with separated batches of the same material or of different materials. If different materials are to be carried in the several pockets care should be taken in loading because of necessity the rearmost pocket must be unloaded first. Unloading then progresses forwardly from pocket to pocket.

To unload the bin, bar 26 is withdrawn from hasps 28 and end gates 23, 24 are swung open. Then bridle 35 of hoist cable 36 is attached to eyes 34 of curtain bar 33. Retaining bar 43 is inserted through the rear end tunnel of curtain 39 and staples 30 are lifted from their positions around bar 33. Then hoist cable 36 is pulled upwardly and rearwardly to strip the bulk material from the rear pocket of bin 11 as the forward end of curtain 39 is pulled rearwardly. In a similar way the remaining batches of material may be sequentially stripped from bin 11.

Having thus explained the objects of my invention, disclosed a preferred form of the apparatus of my invention and the method of operation of the apparatus, I claim:

1. In combination with a truck or trailer body having a continuous plane floor member, a pair of similar rectangular parallel vertical side members, and a displaceable rear end closure member, said side members being finished with horizontal top surfaces having vertical holes therein spaced longitudinally thereof, said body being adapted for general purpose hauling of all types of bulk material, an improved means adapted for temporary use with said body to expedite the discharge of bulk material loaded therein, said improved means comprising a longitudinally flexible sheet member adapted to extend the full width of said floor and to extend longitudinally from adjacent the rear end of said floor forwardly along said floor a desired distance and then upwardly to the height of said side members, said sheet member being formed at each end with tunnel loop means transversely thereof, said improved means including a first stiff bar adapted to extend through the said loop means at the front end of said sheet and rest on the top surfaces of said side members to support the front end of said sheet at the elevation of said top surfaces, said improved means including means insertable in selected ones of said holes in said top surfaces and adapted to engage the ends of said bar to maintain said bar in a desired position, and said improved means including a second stiff bar adapted when said rear closure is displaced to extend through the said loop means at the rear end of said sheet back of said side members, said second bar being adapted to engage the rear edges of said side members to limit the forward movement of said sheet under said bulk material when the said first bar is moved upwardly and rearwardly to discharge said load.

2. The combination of claim 1 including another of said improved means, said sheet member of said other improved means being adapted to extend longitudinally from adjacent the rear end of said floor forwardly atop the sheet member of the first mentioned improved means a lesser desired distance whereby said bulk material loaded in said body will be divided into two parts, one part being rearward of the upwardly extending part of said sheet member of said other improved means, the other part being forward of the upwardly extending part of said sheet member of said other improved means, said one part being positioned to be unloaded by the upward and rearward motion of the first stiff bar of said other improved means and the other part being positioned to be unloaded by the upward and rearward motion of the first stiff bar of the first mentioned improved means.

3. In combination with a truck or trailer body having a continuous plane floor member, a pair of similar rectangular parallel vertical side members and a displaceable rear end closure member, said body being adapted for general purpose hauling of all types of bulk materials, an improved means adapted for temporary use with said body to expedite the discharge of bulk material loaded therein, said improved means comprising a longitudinally flexible sheet member adapted to extend the full width of said floor and to extend longitudinally from adjacent the rear end of said floor forwardly along said floor a desired distance and then upwardly to adjacent the top of said side members, asid sheet member being formed at each end with tunnel loop means transversely thereof, said improved means including a first stiff bar adapted to extend through the said loop means at the front end of said sheet and over said side members thereby to support said sheet at its front end, said improved means including means adapted to be positioned on said side members and engage the ends of said first bar for positioning said first bar longitudinally of said side members, and said improved means including a second stiff bar adapted when said rear end closure is displaced to extend through the said loop means at the rear end of said sheet back of said side members, said second bar being adapted to engage the rear edges of said side members to limit the forward movement of said sheet under said bulk material when the said first bar is moved upwardly and rearwardly to discharge said load.

4. The combination of claim 3 including another of said improved means, said sheet member of said other improved means being adapted to extend longitudinally from adjacent the rear end of said floor forwardly atop the sheet member of the first mentioned improved means a lesser desired distance whereby bulk material loaded in said body will be divided into two parts, one part being rearward of the upwardly extending part of said sheet member of said other improved means, the other part being forward of the upwardly extending part of said sheet member of said other improved means, said one part being positioned to be unloaded by the upward and rearward motion of the first stiff bar of said other improved means and the other part being positioned to be unloaded by the upward and rearward motion of the first stiff bar of the first mentioned improved means.

LEWIS S. RUSSELL.

References Cited in the file of this patent
UNITED STATES PATENTS

| Number | Name | Date |
|---|---|---|
| 280,159 | Ely | June 26, 1883 |
| 529,583 | Beatty | Nov. 20, 1894 |
| 1,329,392 | Ford | Feb. 3, 1920 |
| 1,333,300 | Ferris | Mar. 9, 1920 |
| 2,075,711 | Gilley | Mar. 30, 1937 |
| 2,407,430 | MacRae | Sept. 10, 1946 |
| 2,454,101 | Snead | Nov. 16, 1948 |